United States Patent [19]

Oberg

[11] Patent Number: 5,870,771
[45] Date of Patent: Feb. 9, 1999

[54] COMPUTERIZED SYSTEM FOR SELECTING, ADJUSTING, AND PREVIEWING FRAMING PRODUCT COMBINATIONS FOR ARTWORK AND OTHER ITEMS TO BE FRAMED

[76] Inventor: Larry B. Oberg, 215 Locust, Washington, Mo. 63090

[21] Appl. No.: 749,418

[22] Filed: Nov. 15, 1996

[51] Int. Cl.[6] ................................................ G06F 17/60
[52] U.S. Cl. ........................ 707/502; 345/962; 345/964
[58] Field of Search ................................. 707/517, 502, 707/527; 345/962, 964, 968

[56] References Cited

U.S. PATENT DOCUMENTS

| | | | |
|---|---|---|---|
| 4,149,246 | 4/1979 | Goldman | 364/200 |
| 4,434,467 | 2/1984 | Scott | 364/400 |
| 4,546,434 | 10/1985 | Gioello | 364/300 |
| 5,053,956 | 10/1991 | Donald et al. | 364/401 |
| 5,111,392 | 5/1992 | Malin | 364/401 |
| 5,195,030 | 3/1993 | White | 364/401 |
| 5,291,395 | 3/1994 | Abecassis | 364/401 |
| 5,343,386 | 8/1994 | Barber | 364/400 |
| 5,432,904 | 7/1995 | Wong | 395/161 |
| 5,493,679 | 2/1996 | Virgil et al. | 395/600 |
| 5,535,320 | 7/1996 | Gay et al. | 707/515 |
| 5,550,746 | 8/1996 | Jacobs | 364/479.01 |
| 5,570,292 | 10/1996 | Abrahm et al. | 364/473.01 |
| 5,649,220 | 7/1997 | Yosefi | 395/788 |
| 5,664,352 | 9/1997 | Beckman | 40/545 |

OTHER PUBLICATIONS

FrameShop found on the Internet at: htp:/wwv.visionworksinc.com/visionworksinc/FrameShop.html. Jan. 20, 1997.

*Primary Examiner*—Thomas G. Black
*Assistant Examiner*—John C. Loomis
*Attorney, Agent, or Firm*—Haverstock, Garrett & Roberts

[57] ABSTRACT

A computerized system having means for displaying a digital image of an object such as an object of artwork supplied by the user, analyzing the color composition of the image, searching a database for coordinating frame and matting material products, developing composite images of the user's input with the matching selections, and presenting the digital images to the user so the items may be previewed before placing an order. The system interfaces with a mobile digital camera system for taking digital pictures of input supplied by the customer. The image may be cropped or otherwise altered and combined with the selected frame moulding and matting material combinations. The user may experiment with various features such as color, shape, size, width, number of openings, and other characteristics of frames and matting material until the desired combination is achieved. The system also includes a database of merchandising information such as products and materials, colors and designs available, model numbers, size, material type, cost, and supplier source. The system is capable of generating a printout of the composite image and associated data, and of storing the data for later use.

33 Claims, 5 Drawing Sheets

COMPUTERIZED SYSTEM FOR SELECTING, ADJUSTING, AND PREVIEWING FRAMING PRODUCT COMBINATIONS FOR ARTWORK AND OTHER ITEMS TO BE FRAMED

FIELD OF THE INVENTION

This invention relates generally to the field of image processing, and more specifically to a computerized system that accepts image input, allows a user to modify the image, analyzes the image, searches a database for coordinating accessories in the area of home furnishings, particularly frame mouldings and matting materials for artwork, allows the user to choose from among the items found by the system or to make his own selections from the database, and generates a composite image of the input and the product selections to allow the user to preview candidate combinations before making a final selection.

BACKGROUND OF THE INVENTION

In many areas of interior design and furnishings, a customer is presented with a daunting array of products available from which to choose. Such products include carpeting, vinyl and wood floorings, wallcoverings, upholstery and drapery fabrics, paint, furniture styles, and decorating accessories such as paintings, prints, sculpture and statuettes, woven wallhangings, crafts, and needlework. In the area of picture framing, it is known to provide a customer with small sections of frame mouldings and matting of various textures and colors, and to select frame and matting combinations based on how they appear when held close to the artwork to be framed. Artwork may include prints, painting, needlework, photographs, documents, and any other object a person would desire to have framed. Framing products may include frame mouldings, matting and related materials such as fillets and decorative designs that may be applied to the matting, and any other items used in framing artwork. For most prints, paintings, and related matter, it is difficult to envision how the total finished product will appear especially if the frame and matting samples are relatively small or the artwork is large in size. It is also cumbersome for store personnel trying to help the customer by holding the artwork up with the small sections of frame and matting near one corner or edge, so the customer can stand back for a better perspective. A further drawback is the difficulty in seeing how various widths, layers, colors, textures, and other enhancements of matting appears next to the artwork and frame moulding.

The process of narrowing the field to preferred combinations can be very time consuming, and other customers may begin to feel neglected by store personnel who are completely occupied by one customer. A further difficulty occurs when a customer wants to compare many different combinations. Additionally, a vendor may run out of space to display all the many product samples that are available.

A further drawback to current practice is that some store personnel are more skilled than others in selecting or suggesting combinations of frame mouldings and matting materials based on their training, experience, and level of artistic and creative ability. Thus, with unskilled personnel, the selection process may be more time-consuming, or lead to less optimal results than desired. Additionally, a customer may have difficulty remembering the various combinations of materials presented or envisioning how the total finished product will appear.

In the field of image processing and storage, it is well known that digital representations of visual objects may require relatively large amounts of storage space, and manipulation of digital images often requires very high speed computer processing capabilities. Updating to systems with ever-increasing capabilities to handle image processing and storage requirements is commonly required. Additionally, computer software applications are usually developed to use computer resources as efficiently as possible, both for satisfactory system performance and to allow for future growth in software applications without the need to constantly update the associated computer hardware. Efficient methods for a given application are typically developed based on the hardware characteristics of the system.

Image processing and previewing systems are well known in various fields of the prior art, such as those described in U.S. Pat. Nos. 4,434,467 for calculating hair color; 4,546,434 for designing apparel; 4,149,246 for specifying custom garments; 5,195,030 for foot shape imaging and overlay; 5,343,386 for making electronically-produced postcards; and 5,432,904 for developing auto repair estimates. These devices, however, are substantially different in field of use, purpose, and construction and, accordingly, are not described in detail herein.

U.S. Pat. No. 5,291,395 issued to Abecassis for a wallcovering storage and retrieval system applies to the area of home furnishings. The system disclosed therein allows a user to input information relating to particular styles, patterns, motifs, and colors. The system then outputs one or more numbers referring to samples of wallcoverings and/or coordinating products such as borders, fabrics, and bed linens that meet the customer's criteria. The system does not have an image database associated with it and, therefore, the customer cannot view samples of the selected wallcoverings on a video monitor. Instead, a customer must physically go to a separate location within a store or warehouse to view each product. U.S. Pat. No. 5,111,392 issued to Malin applies to the field of interior design and discloses a system for designing an arrangement of office furniture pieces in which the designer selects a basic shape for the furniture from a library of predetermined shapes, adjusts the dimensions, creates groupings, and selects finish, color, and fabrics needed to complete the design. The system disclosed in Malin does not, however, have means to allow a designer to input his or her own elements and incorporate them into the design, such as fabrics, paintings, or other decorating accessories. The designer is limited to the library database provided by the product manufacturer.

U.S. Pat. No. 5,053,956 issued to Donald et al. discloses a system for retail trading comprising means for storing images of items being traded, means for identifying, selecting, and retrieving the stored images, and means for displaying retrieved images either alone or combined with an image supplied by the user. The disclosure and claims associated with Donald et al. cover a wide range of items that can be traded including carpets, furniture, clothing, household textiles, homewares, and even motor vehicles. The system does not, however, teach an image processing system that includes means to combine various frame mouldings and matting with artwork or the like, or to vary the color, size, or number of openings in matting materials. It also does not disclose means for using image storage space and processing capability efficiently, such as by storing only one segment of a design having a repetitive pattern and piecing segments together based on the size of the object selected by the customer, nor does it disclose or even suggest a system that will analyze the customer's artwork and then search for and present images of frame mouldings and colored accent matting that coordinate with the artwork.

SUMMARY OF THE INVENTION

It is, therefore, a principle object of the present invention is to enable a customer of an art supply business to be able to select a picture or other item to be framed and to be able to visualize the picture or other item enclosed by a frame and in some cases with matting.

Another object is to produce a visual display of an object to be framed in order to coordinate the dimensions and color characteristics of the frame to the object to be framed without having to handle the framing or matting material before the selection can be made.

Another object is to produce a video display of an object to be framed which will enable a customer to visualize various color schemes and physical dimensions of the framing and matting material items so that a decision can be made by the customer as to the most desirable arrangement of framing and matting material.

Another object is to produce a visual display of an object to be framed which can be viewed at the vendor's location or taken home for viewing.

Another object is to make it possible to satisfy the customers desires in framing an object without having to hold bits and pieces of the framing and matting materials next to the object to be framed.

The present invention comprises a computerized system that provides means for developing a digital image of an object such as an object of artwork supplied by the user, analyzing the color composition of the image, searching a database for coordinating frame and matting material products, developing composite images of the user's input with the matching selections, and presenting the digital images to the user so the items may be previewed before placing an order.

The software associated with the present invention is a program or set of programs that may interface with a mobile digital camera system, designed to be connected to computer processing means such as an IBM-PC or Macintosh computer, for taking pictures in digital format. Once a digital picture of the customer's object is taken, the computer will display it as two-dimensional or three-dimensional image on a display screen. The system may incorporate a device that presents an actual three-dimensional display, such as a holographic display system. The image can be modified if desired. There are various display screens that allow the customer to input a request to the system to analyze the color composition of the input and supply images of color-coordinated items, to search the database for coordinating products, to change the configuration of the framing products, and to output data to various output devices. The system is capable of creating a composite visual concept of a customer's order and allows the customer to adjust the color, size, width and other characteristics of frames and matting materials until the desired combination is achieved.

The system also includes a retrievable, interactive database composed of merchandising information such as products and materials, colors and designs available, model numbers, size, material type, and supplier source. The system is capable of generating a bill of material or order template that lists the customer's name, address, and phone number, the products or component materials selected, and it optionally allows store personnel to enter the cost, labor charges, and sales tax associated with the order or the software associated with the system may calculate these figures at the user's request. A print command is available to acquire one or more copies of the finished order including an image of the order, the bill of material, and the customer order cost.

It is also anticipated that the program will perform project management control functions to assure timeliness in accomplishing projects, accounting functions, inventory tracking functions, and network interface functions for allowing multiple users within one store and even between stores to access the present system. Customers will also have access to the software via the Internet which will allow them to make their selections, place orders, and make payment from their home.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

DESCRIPTION OF THE PREFERRED EMBODIMENTS

Figure 1:
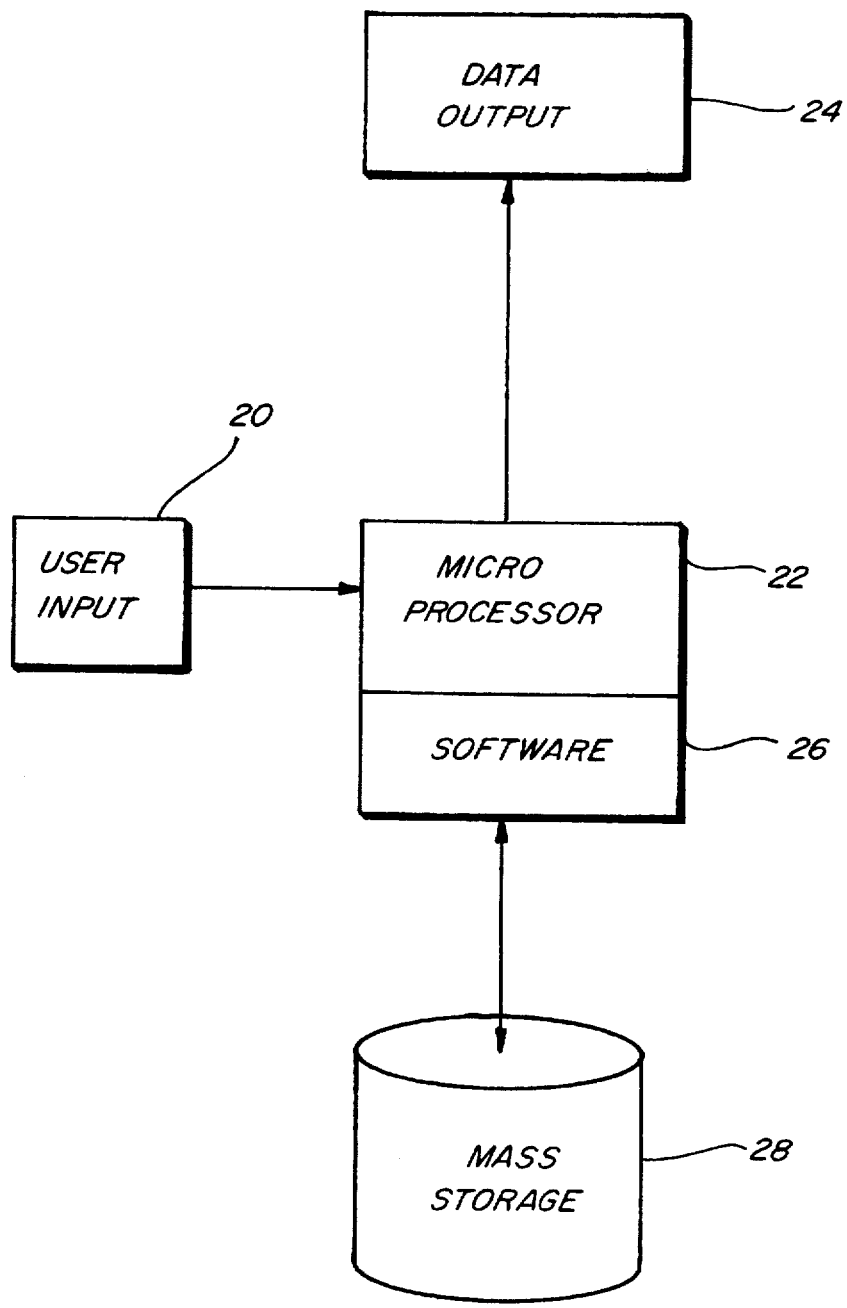
FIG. 1 is a diagrammatic representation of the system components and interconnections of the present invention.

Referring now to FIG. 1, the hardware required in the present invention is shown in block diagram form to represent the various components that may be connected to meet the user's requirements. Means for providing input into the system 20 are shown connected to a microprocessor 22 and may include such items as a keyboard, mouse, touch screen, data file, a voice recognition system, a digital image generator such as a digital camera, and any other peripheral devices capable of providing input to a microprocessor. The microprocessor 22 is also connected to one or more output means 24 which may include a visual display monitor, a modem, a facsimile machine, a printer, a magnetic storage device, a system that generates audible sounds for requesting input or otherwise sending a signal to the user, including voice signals, a video cassette recorder, television, and any other peripheral devices capable of accepting data output from the computer, prompting the user for input, displaying computer generated images and data, transmitting data, and/or storing computer generated images and data. Software 26 for controlling the input means 20 and the output means 24, for image processing and analysis, for database retrieval and storage, and for inventory and accounting functions is loaded into memory in the microprocessor. The instructions contained in the software 26 are executed by the microprocessor 22. The present invention also includes storage means 28 connected to the microprocessor 22 for storing images of frame mouldings and matting material in digital format that may be processed by the software 26 and combined with images of artwork supplied by the user. Many frame mouldings and matting materials are comprised of repeating patterns or designs around the edges while some frames and matting material do not have a pattern associated with them. The present invention makes efficient use of the storage means 28 by storing only one fall pattern, or just a small segment of digital images of frame mouldings and matting material, and then using processing means in the software 26 to calculate the number of segments that must be pieced together to surround the periphery of the artwork. This implementation can be used whether the frame selected is a ready-made or photo frame with fixed dimensions, or custom-sized. If the frame is ready-made, the software is limited in the number of segments it can piece together on each side. This gives the customer a wide range of choices of frame mouldings and matting material, while maximizing the number of images that may be stored. Other merchandising information pertaining to the frame mouldings and matting material may also be stored such as colors and designs available, material identification numbers, size, material type, supplier source, prices, manufacturers, model numbers and whether the item is available in inventory. In an alternative embodiment, images of artwork may be stored in the system and retrieved by the customer. This would be convenient in situations where a customer wants to buy the artwork and have it custom-framed by the store.

Any combination of the above-mentioned input means 20 may be used. The keyboard provides means for the user to input alphanumeric data as well as making choices from possible selections presented to the user on a display monitor. A mouse provides means for the user to position a cursor over a desired selection presented on a display monitor and click a button to indicate his choice to the system. A mouse can also be used to "grab and drag" portions of graphic images across the display screen, and is useful in sizing and positioning functions such as adjusting the borders of matting. A touch screen comprises an array of sensors along the sides of a screen, such screen being either built into or overlaying a video display monitor upon which graphics generated by the microprocessor are displayed. The graphics typically include annotated selection areas corresponding to the user's possible choices. When a user touches the screen in the location corresponding to his selection, the light detected by some of the sensors is blocked and the location of this interruption is registered by the system. The input from these devices then control the functions performed by the software 26 residing in the microprocessor 22. Alternatively, a data file may be used to provide input to the software programs and may contain information such as the size of the artwork to be framed, colors for the matting material, the number of mattings desired and the dimension and location of the opening for each, model numbers of frame moulding, or any other information required by the software to generate output. The data file may be stored in the microprocessor's memory or it may be supplied on a diskette, CD ROM, or other magnetic storage device.

In the preferred embodiment, the present invention is designed to allow a customer to bring in artwork or other objects that they desire to have framed, input an image of the artwork into a microprocessor, and have the image displayed on video monitor. The software 26 allows the user to crop the input image and select images of frame moulding and matting materials. Therefore, a key feature of the present invention is the use of an image generator such as a digital camera that is capable of providing a digital snapshot image of an object such as a painting or other object of artwork to the microprocessor 22. Several manufacturers supply this type of camera and they are commercially available.

Figure 2A:
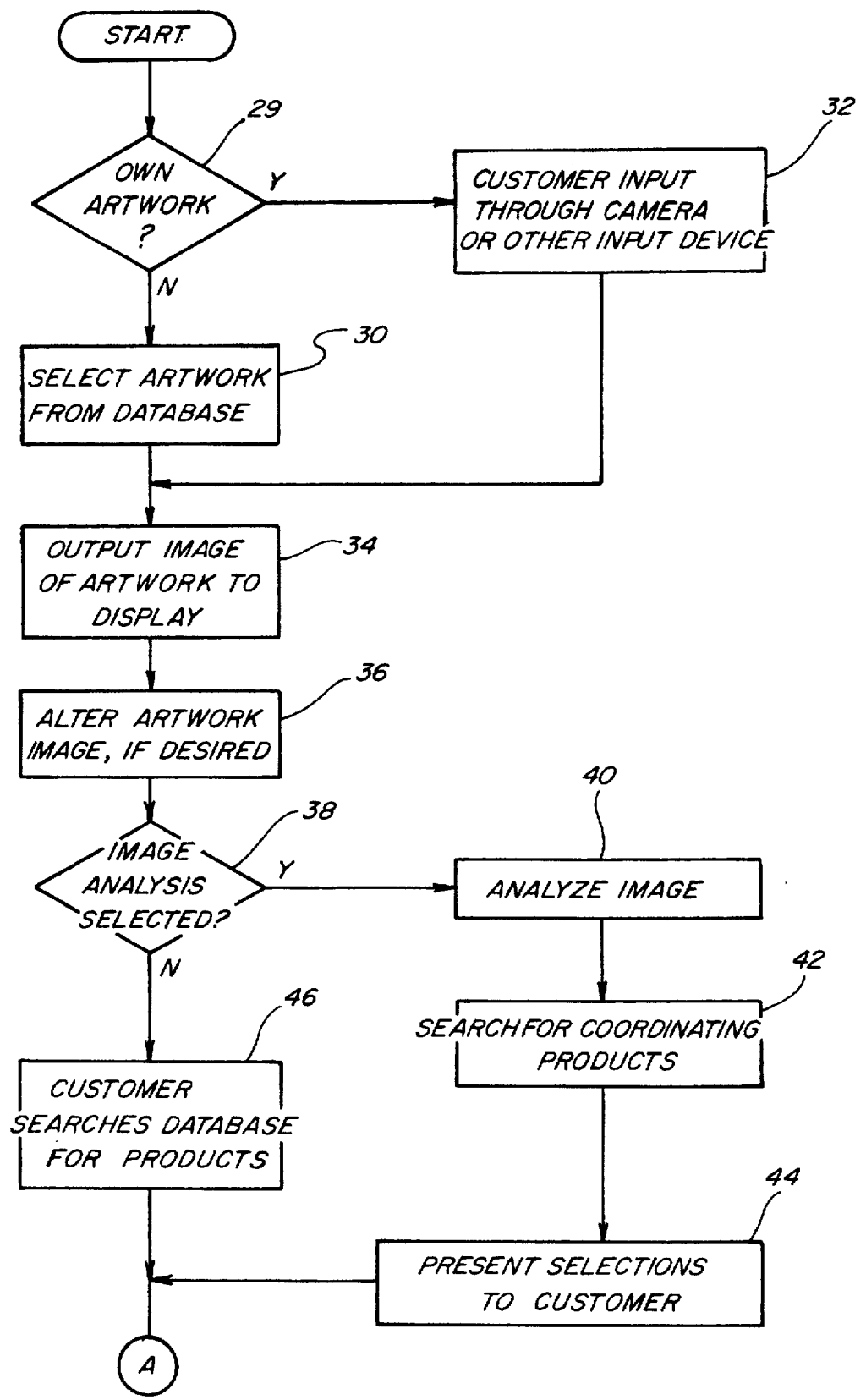
FIG. 2A, FIG. 2B, and FIG. 2C is a flowchart representation of the software associated with the present invention.
Figure 2B:
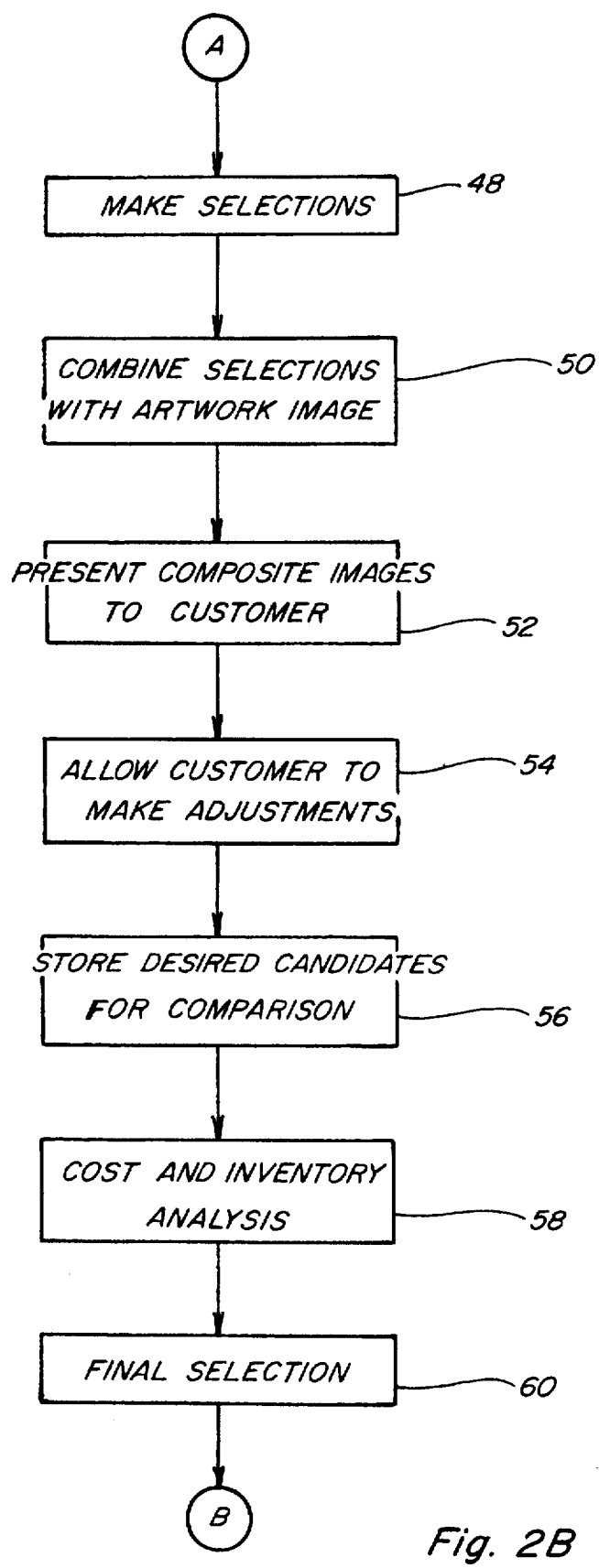
Figure 2C:
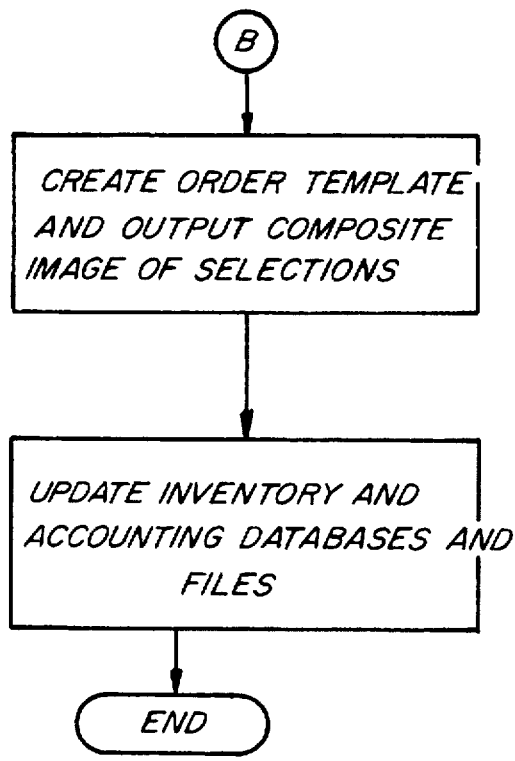

Referring now to FIGS. 2A, 2B, and 2C, at the beginning of a session at 29, a customer chooses to select from images of artwork already stored in the system at 30 or, alternatively, a customer can input a digital image of an object to be framed to the system through a digital camera 32. Once input is supplied, the system outputs a digital image of the object at 34 to a display that is visible to the customer. The digital image can then be modified at 36 as the software allows the customer to crop the edges, delete unnecessary or undesirable portions of the image, or alter the image in some other way such as by changing colors or features, or combining the original image with portions from other digital images.

Once the input image appears in a form the customer desires to have framed, the system allows the customer to choose whether to have the system analyze the image at 38, and search the database for coordinating products at 42, or the customer may decide to search the product database at 46 on his own. The portion of the software that analyzes the input 40 and develops its own combinations from the products available in the database 42 is an expert system that emulates store personnel who are trained in selecting coordinating combinations of frame moulding and matting material based on the color composition and subject matter of the artwork. Thus, this portion of the software can be sophisticated enough to perform image recognition to determine the subject matter, or it may prompt the user to input the general subject matter of the artwork such as nature scenes, animals, people, formal or informal settings, and whether the customer wants to limit the search to particular types of materials, such as wood or metal. The software is also capable of analyzing the input image for color composition, determining dominant and secondary colors, and presenting combinations that complement the artwork. The customer may also instruct the system to search for coordinating combinations within a certain price range. If the customer decides to search the product database on his own, the software in the present invention allows him to search according to various input criteria such as types of materials for frame moulding, matting material colors, cost, or whether he desires a ready-made frame or a custom-made frame.

The present invention then allows the customer to make his selections at 48 from among the possible choices. During the selection process at 48, the customer can specify single or multiple matting with a single or multiple openings. The opening or openings can have any geometric shape such as rectangle, triangle, square, circle, and oval, and may be positioned at the desired location and repositioned or resized with or without the mouse. The widths of the matting along any side of the artwork is variable and selectable, and the framing projects can be of any size. A zoom-in/zoom-out feature is supplied that allows to the customer to zoom-in to view portions of the composite image in greater detail and then zoom-out to get a total overall image. This is especially useful where the object to be framed is very large and the resolution of the image output device is not high enough to reveal details such as carvings or patterns in a selected frame moulding. The customer may also select from a variety of designs that may be applied to the borders of the matting material and the system will incorporate the designs in the composite digital image. Once the specifications are entered, the present invention combines the selections with the input image at 50 and presents the composite images to the customer at 52 on a display monitor. The composite images may also be sent to some other output device which the customer can use to view the composite images, either at that time, or at a later time, such as by means of a video cassette recorder, or magnetic storage.

The software associated with the present invention also allows the customer to adjust sizes and colors of the frame and matting material at 54 once they are combined with the input image. If the customer is pleased with the result, he can then store the candidate combination for later review at 56 once he has viewed the remaining initial selections. In reviewing the stored candidates, the customer may request the system to display any number of the stored images simultaneously for comparison. The customer can also request the system to calculate total cost of each selection and indicate the availability of the merchandise at 58. The customer then makes a final selection at 60. The present invention can create an order template for store personnel to work from that displays designs and measurements agreed to by the customer, and a bill of material and cost at 62. A print command is available to acquire one or more copies of the finished framed order including an image of the order, the bill of material, and the total order cost at 62.

It is also anticipated that the present invention will have the capability to update inventory and accounting records 66 that are stored in the system to reflect the materials used in filling a customer's order. A project management feature in the present invention will help assure timeliness in accomplishing projects. Further, the present invention will include network capabilities so that multiple users within one store are able to experiment with various combinations of frame mouldings and matting material for their artwork with or without the assistance of store personnel. Customers will also have access to the software via the Internet which will allow them to make their selections, place orders, and make payment from their home. The present invention may be used by a variety of customers including professional photographers who often have an inventory of ready-made frames or photo frames available for their customers to choose from. The photographer would be able to show his customer digital images of the photographs he has taken and also suggest various frames and matting material combinations to complement the photos.

Figure 3:
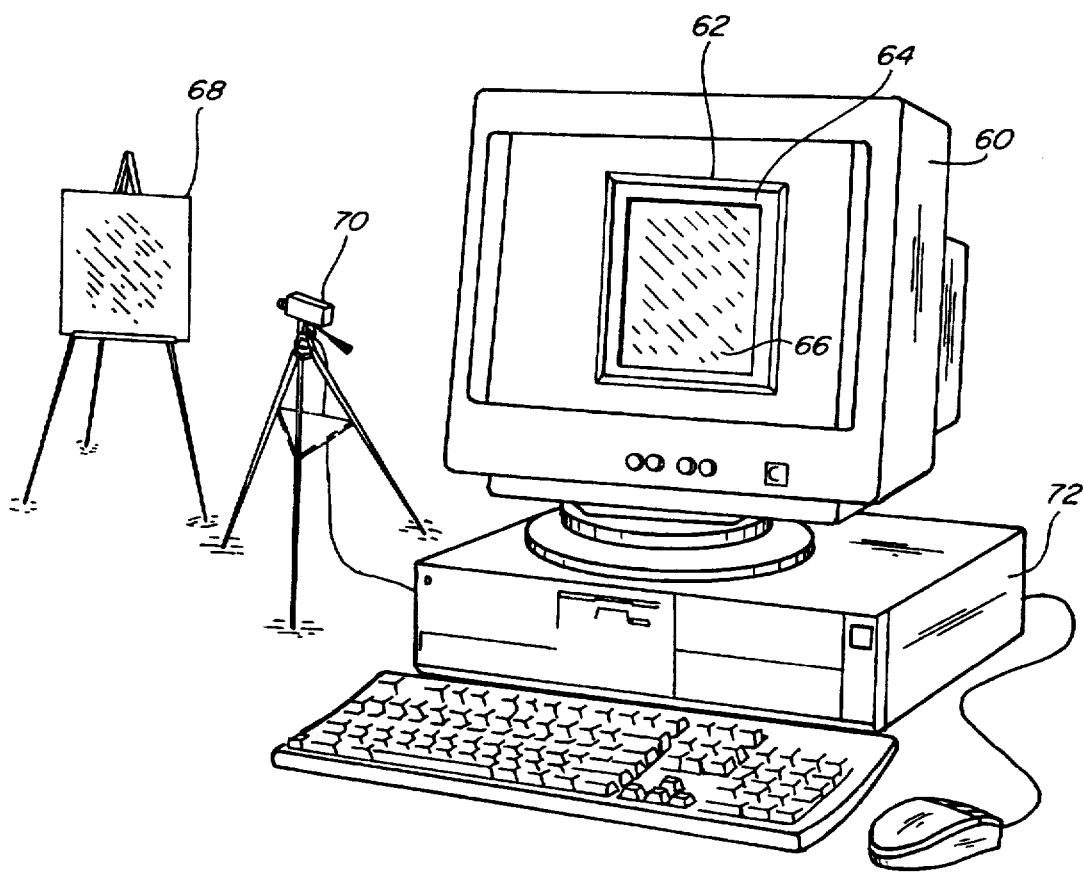
FIG. 3 is a representation of a composite image produced by the present invention.

In FIG. 3, a computer display monitor 60 is shown with frame moulding 62 and matting material 64 superimposed on an input image 66 that was supplied by the user by taking a snapshot of the artwork 68 with a digital camera 70 and inputting it into the microprocessor 72. The image processing software executing in the microprocessor allows the user to crop the image of the artwork to delete portions that the user does not wish to include in the final framed picture. After the user selects the frame moulding and matting material combinations, the image processing software superimposes them on the input image and then allows the user to adjust the location, size and shape of the opening that is to be cut in the matting. The software program allows the user to save a number of composite images for later review. The images may be saved temporarily within the memory associated with the microprocessor, or the images may be downloaded to a separate storage device such as a diskette, or to a video tape recorded by a video cassette recorder.

Figure 4:
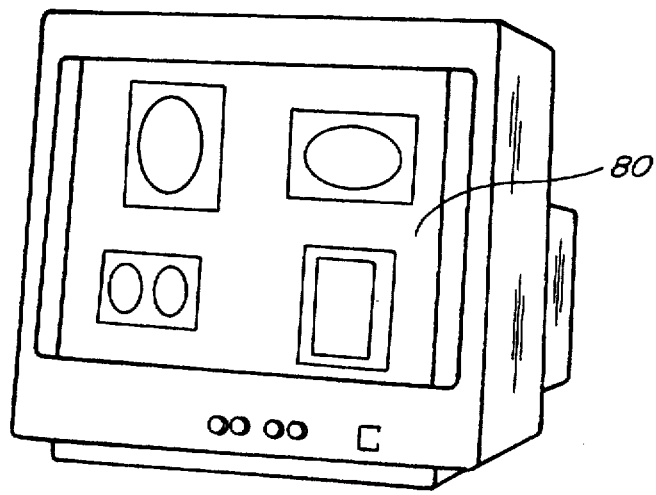
FIG. 4 is a representation of multiple composite images produced by the present invention and displayed simultaneously for comparison.

The image processing software in the system is also capable of presenting multiple composite images for display simultaneously, which may make it easier for the user to compare various configurations. FIG. 4 illustrates this capability by showing a number of composite images 80 with different locations, orientations, and shapes of openings in the matting material. Once again, the user may vary the appearance of the input image, the openings in the matting material, the colors of the matting material, as well as the frame moulding through the operation of the image processing software. The present system thus allows the user to interactively experiment with various combinations and see the composite image updated in a very short time.

While the invention has been shown and described with reference to preferred embodiments thereof, it will be understood by those skilled in the art that the foregoing and other changes can be made therein without departing from the spirit and scope of the invention. The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of selecting, adjusting, and previewing frame moulding and matting material combinations for artwork comprising the following steps:

supplying an image of artwork to be input to a microprocessor through an input device;

displaying the input image on an output device connected in electronic communication with the microprocessor;

searching a storage device connected in electronic communication with the microprocessor for digital images of framing supplies;

selecting the desired framing supplies;

generating a composite image of the input image and the selected framing supplies;

outputting the composite image to at least one output device connected in electronic communication with the microprocessor;

altering the image of the selected framing supplies through input to the image processing software program; and outputting the composite image to the output device.

2. The method disclosed in claim 1 further comprising the step of altering the input image with an image processing software program being executed by the microprocessor and updating the displayed image as it is altered.

3. An interactive computerized system for selecting, adjusting, and previewing combinations of frame moulding and matting material products for artwork comprising:

at least one microprocessor capable of executing one or more software programs that perform input and output control, and digital image processing and analysis, and provide related information;

at least one input device connected in electronic communication with the microprocessor capable of accepting input data required by the software program to accomplish its functions, the image processing software program having means to accept an image input by the user, allow the user to modify the input image, allow the user to select the frame moulding, the matting material, and the size, shape, and placement of the opening to be cut in the matting material, and generate a composite image of the frame moulding and matting material combinations superimposed on the input image;

at least one output device connected in electronic communication with the microprocessor capable of displaying images and data output by the software program;

at least one storage device connected in electronic communication with the microprocessor capable of storing image data of artwork, frame mouldings, and matting material products and allowing the data to be retrieved and stored by the input and output control software programs.

4. The system disclosed in claim 3 wherein the image data of the frame mouldings and matting material are stored in a space saving format whereby only nonrepetitive segments are stored and the image processing program calculates the number of image segments to place together to generate images of frame mouldings and matting material that surround the periphery of the input image.

5. The system disclosed in claim 3 wherein the image processing software is capable of determining the color composition of the input image and searching the database for coordinating products.

6. The system disclosed in claim 3 wherein the output device connected in electronic communication with the microprocessor is capable of storing digital images and related data output by the software program.

7. The system disclosed in claim 3 wherein the output device connected in electronic communication with the microprocessor is capable of transmitting images and related data output by the software program.

8. The system disclosed in claim 3 wherein the output device connected in electronic communication with the microprocessor is capable of generating audible signals.

9. The system disclosed in claim 3 wherein the input device connected in electronic communication with the microprocessor is a keyboard.

10. The system disclosed in claim 3 wherein the input device connected in electronic communication with the microprocessor is a mouse.

11. The system disclosed in claim 3 wherein the input device connected in electronic communication with the microprocessor is a touch screen.

12. The system disclosed in claim 3 wherein the input device connected in electronic communication with the microprocessor is a digital camera.

13. The system disclosed in claim 3 wherein the input device connected in electronic communication with the microprocessor is a voice recognition system.

14. The system disclosed in claim 3 wherein the software programs generate customer order information.

15. The system disclosed in claim 3 wherein the software programs generate accounting information.

16. The system disclosed in claim 3 wherein the software programs generate inventory information.

17. The system disclosed in claim 3 wherein the image processing software is capable of generating multiple openings in the matting material and allowing the user to indicate the size, placement, and orientation of the openings.

18. The system disclosed in claim 3 wherein the storage device is capable of storing merchandising information related to the frame mouldings and matting material.

19. A computerized system for selecting, adjusting, and previewing combinations of frame moulding and matting material products for artwork comprising:

at least one microprocessor having memory means and capable of executing one or more software programs that perform input and output control, and digital image processing and analysis functions;

at least one input device connected in electronic communication with the microprocessor capable of accepting data required by the software program to accomplish its functions;

at least one storage device connected in electronic communication with the microprocessor capable of storing image data of artwork, frame mouldings, and matting material products, and allowing the data to be retrieved and stored by the input and output control software programs, the image processing software program having means to retrieve image data from the database, allow the user to modify the image, allow the user to select the framing products, and the number, size, shape, and placement of openings to be cut in the matting material, and generate a composite image of the framing product combinations superimposed on the input image; and at least one output device connected in electronic communication with the microprocessor capable of displaying images output by the software program.

20. The system disclosed in claim 19 wherein the image data of the framing products are stored in a space saving format whereby only nonrepetitive segments of the products are stored and the image processing program calculates the number of image segments to place together to generate images of frame mouldings and matting material that surround the periphery of the input image.

21. The system disclosed in claim 19 wherein the image processing software is capable of determining the color composition of the input image and searching the database for coordinating products.

22. The system disclosed in claim 19 wherein the output device connected in electronic communication with the microprocessor is capable of storing digital images and related data output by the software program.

23. The system disclosed in claim 19 wherein the output device connected in electronic communication with the microprocessor is capable of transmitting digital images and related data output by the software program.

24. The system disclosed in claim 19 wherein the output device connected in electronic communication with the microprocessor is capable of generating audible signals.

25. The system disclosed in claim 19 wherein the input device connected in electronic communication with the microprocessor is a keyboard.

26. The system disclosed in claim 19 wherein the input device connected in electronic communication with the microprocessor is a mouse.

27. The system disclosed in claim 19 wherein the input device connected in electronic communication with the microprocessor is a touch screen.

28. The system disclosed in claim 19 wherein the input device connected in electronic communication with the microprocessor is a data file.

29. The system disclosed in claim 19 wherein the software programs generate customer order information.

30. The system disclosed in claim 19 wherein the software programs generate accounting information.

31. The system disclosed in claim 19 wherein the software programs generate inventory information.

32. The system disclosed in claim 19 wherein the image processing software is capable of generating multiple openings in the matting material and allowing the user to indicate the size, placement, and orientation of the openings.

33. The system disclosed in claim 19 wherein the storage device is capable of storing merchandising information related to the framing products.

* * * * *